(12) United States Patent
Kawahara et al.

(10) Patent No.: US 8,931,976 B2
(45) Date of Patent: Jan. 13, 2015

(54) TSUNAMI BREAKWATER WALL OF MULTILAYERED STEEL PIPE PILE STRUCTURE AND ITS CONSTRUCTION METHOD

(71) Applicant: The Chugoku Electric Power Co., Inc., Hiroshima (JP)

(72) Inventors: Kazufumi Kawahara, Hiroshima (JP); Yuichi Shimizu, Hiroshima (JP); Kouji Tasaka, Shimane (JP)

(73) Assignee: The Chugoku Electric Power Co., Inc., Hiroshima (JP)

( * ) Notice: Subject to any disclaimer, the term of this patent is extended or adjusted under 35 U.S.C. 154(b) by 0 days.

(21) Appl. No.: 13/676,191

(22) Filed: Nov. 14, 2012

(65) Prior Publication Data

US 2014/0133912 A1    May 15, 2014

(51) Int. Cl.
*E02B 3/06* (2006.01)
(52) U.S. Cl.
CPC ..................................... *E02B 3/062* (2013.01)
USPC ............................................ 405/21; 405/280
(58) Field of Classification Search
USPC ............................................. 405/20, 21, 280
See application file for complete search history.

(56) References Cited

U.S. PATENT DOCUMENTS

| 4,801,221 | A | * | 1/1989 | Capron | 405/34 |
| 5,388,931 | A | * | 2/1995 | Carlson | 405/274 |
| 5,800,096 | A | * | 9/1998 | Barrow | 405/267 |
| 7,513,715 | B2 | * | 4/2009 | Nickelson et al. | 405/274 |
| 2003/0190194 | A1 | * | 10/2003 | Kostelnik et al. | 405/129.45 |

FOREIGN PATENT DOCUMENTS

| JP | 6-40027 | 5/1994 |
| JP | 7-23022 | 4/1995 |
| JP | 2001-003331 | 1/2001 |

* cited by examiner

*Primary Examiner* — Tara M. Pinnock
(74) *Attorney, Agent, or Firm* — Harness, Dickey & Pierce, P.L.C.

(57) ABSTRACT

A tsunami breakwater wall of a multilayered steel pipe pile structure 1, includes a multilayered steel pipe pile 2 where a bottom end thereof reaches a predetermined depth of a support layer 28 and is installed to a ground 26 such that an upper end thereof protrudes upward from a ground surface 26*a*, and a wall body 15 constructed integral with a part of the multilayered steel pipe pile 2 that protrudes upward from the ground surface 26*a*. The multilayered steel pipe pile 2 is made from a plurality of large diameter steel pipe piles 3-5 of different diameters, an upper end of an inner most side steel pipe pile 3 protrudes upward from the ground surface 26*a*, and the wall body 15 is constructed to a part of the steel pipe pile 3 protruding upward from the ground surface 26*a*.

8 Claims, 3 Drawing Sheets

TSUNAMI BREAKWATER WALL OF MULTILAYERED STEEL PIPE PILE STRUCTURE AND ITS CONSTRUCTION METHOD

BACKGROUND

1. Technical Field

The present invention relates to a tsunami breakwater wall of multilayered steel pipe pile structure and its construction method. In particular, the invention relates to a tsunami breakwater wall of multilayered steel pipe pile structure and its construction method that is advantageous in withstanding tsunamis and earthquakes and effective for providing measures against tsunamis at areas such as seashores and seaports.

2. Related Art

The off the Pacific coast of Tohoku earthquake (the huge earthquake that occurred with the epicenter off the Sanriku Pacific Coast on Mar. 11, 2011) had brought damages due to the tsunami creating the need for immediate provision of tsunami-resistant facilities such as a tsunami breakwater and the like at the seashore, seaports and the like. Various facilities have already been built in these areas and are used for navigation of ships, cargo work, freight transport complex and the like and therefore, tsunami-resistant facilities such as tsunami breakwaters need to be built taking such circumstances into consideration.

Japanese Utility Model Application Examined Publication No. 6-40027 (PTL 1) describes an example of a breakwater. This breakwater is constructed by placing into the ground in a row, a plurality of steel pipes each of them being one to two meters in diameter, in a wall form such that a gap is formed between adjacent steel pipes and coupling between the top parts of the row of steel pipes with concrete copings.

Two openings one above and one under a portion proximate the water level, are provided to the surfaces of the above described steel pipes. And a horizontally facing partition panel is provided to each of the portions within the steel pipes corresponding to the middle of the two openings.

According to the breakwater described in PTL 1, waves passing through the gaps between the steel pipes can be reduced by dissipating the waves close to the water level with the openings and partition panels in the steel pipes of the row of steel pipes thus improving the wave-dissipating capability.

Additionally, Japanese Utility Model Application Examined Publication No. 7-23022 (PTL 2) describes another example of a breakwater. This breakwater is constructed as a gravity-type levee by installing a plurality of steel foundation piles into the ground of the seabed, coupling between the top parts of the foundation piles with reinforced concrete footings to structure an artificial ground and placing a concrete caisson above this artificial ground.

An upright portion is provided to the side end part of the above described footing, a mound layer composed of waste rock or gravel is formed to a portion surrounded by this upright portion and the top face of the footing, and a caisson is set on top of this mound layer. Further, the top portions of the foundation piles are inserted into the outer tubular steel pipes embedded in the footing and concrete is placed in the gaps between the foundation piles and the outer tubular steel pipes in the aforementioned state so to couple the top portions of the foundation piles to the footing.

According to the breakwater described in PTL 2, the constituent material of the mound layer between the artificial ground and the gravity-type levee is prevented from scattering during construction and use, so the ground contact pressure of the gravity-type levee can be transferred to the footing of the artificial ground in a dispersed and eased manner so that the load on the footing can be alleviated. Furthermore, since the structure is such that the artificial ground and the gravity-type levee are not fixed, horizontal force applied to the gravity-type levee is transferred to the artificial ground by friction, the horizontal force that is equal to or greater than the frictional force is not transferred to the foundation piles of the artificial ground even when a wave pressure beyond assumption acts on the gravity-type levee thus alleviating the load on the foundation piles. Additionally, since the top portions of foundation piles are inserted into the outer tubular steel pipe of the footing, the spaces between the foundation piles and the outer tubular steel and pipes are coupled with concrete, the coupling portions between the footing of the foundation piles can be reinforced.

Japanese Patent Application Laid-open Publication No. 2001-3331 (PTL 3) describes further another example of a breakwater. This breakwater includes a plurality of piles installed in two rows so that the head portions protrude from the surface of the seabed, a curtain wall that is integrally provided to the row of piles on the off shore side and orthogonal to the direction in which the waves move, and a connecting block that is provided to integrate the top portions of the four piles.

The aforementioned curtain wall is formed by combining a plurality of approximately T-shape wave-dissipating blocks. Further, each of the wave-dissipating blocks has provided thereto a penetration hole that vertically penetrates each wave-dissipating block. And a wave-dissipating block and a pile are integrated by inserting the pile into this penetration hole.

According to the breakwater described in PTL 3, a curtain wall composed of a plurality of wave-dissipating blocks supported by a row of piles on the off shore side can be constructed by inserting each of the piles of the row of piles on the off shore side into the penetration holes of each of the wave-dissipating blocks. Additionally, the row of piles on the off shore side and the row of piles on the shore side can be integrated by integrating with a connection block between the top portions of four piles of the row of piles on the off shore side and the row of piles on the shore side. Accordingly, the construction performance can be improved and thus allowing the construction costs to be reduced.

CITATION LIST

Patent Literatures

PTL1 Japanese Utility Model Application Examined Publication No. 6-40027
PTL2 Japanese Utility Model Application Examined Publication No. 7-23022
PTL3 Japanese Patent Application Laid-open Publication No. 2001-3331

By the way, the breakwaters with structures as those described in PTL 1 through 3 cannot satisfy the quake resistance and tsunami resistance based on the latest knowledge such as those on the off the Pacific coast of Tohoku earthquake and the like. Further, since the breakwaters of PTL 2 and 3 require a wide space for placement, they cannot be applied when the area where the tsunami-resistant facilities are to be built already has facilities such as power plants and the like and are used for navigation of ships, cargo work, freight transport complex and the like since such breakwaters would interfere with their operation.

SUMMARY OF THE INVENTION

The present invention has been made in view of the aforementioned conventional problems and an object thereof is to apply a tsunami breakwater wall of multilayered steel pipe pile structure and its construction method that satisfies quake resistance and tsunami resistance based on the latest knowledge such as those on the off the Pacific coast of Tohoku earthquake and the like and that can be built without posing a problem to the operations of facilities that have been already been built, navigation of ships, cargo work, freight transport complex and the like.

In order to solve the problems as those described above, the present invention adopts a means as in the following. In other words, a tsunami breakwater wall of multilayered steel pipe pile structure according to an aspect of the present invention for solving the above-described problem, includes a multilayered steel pipe pile where a bottom end thereof reaches a predetermined depth of a support layer and is installed to a ground such that an upper end thereof protrudes upward from a ground surface, and a wall body constructed integral with a part of the multilayered steel pipe pile which protrudes upward from the ground surface. Note that, in the present invention, a "wall body" is a concept that includes wall bodies made of reinforced concrete, steel framed concrete and steel framed reinforced concrete.

Additionally, in the present invention, the multilayered steel pipe pile may be made from a plurality of large diameter steel pipe piles of different diameters.

Further, in the present invention, an upper end of an innermost side steel pipe pile of the multilayered steel pipe pile may protrudes upward from the ground surface, and the wall body may be constructed to a part of the steel pipe pile protruding upward from the ground surface.

Further, in the present invention, space may be provided respectively, on an inner surface side of an innermost steel pipe pile of the multilayered steel pipe pile, between adjacent steel pipe piles, and on an outer side of a steel pipe pile of the outermost side, and filling material may be filled into the spaces.

Further, in the present invention, a part of an inner face side of the innermost side steel pipe pile which protrudes upward from the ground surface may be formed hollow.

Further, a tsunami breakwater wall construction method according to an aspect of the present invention for solving the above-described problem, includes a process of placing a multilayered steel pipe pile to a ground so that a bottom end thereof reaches a predetermined depth of a support layer and an upper end thereof protrudes upward from a ground surface, and a process of constructing a wall body integral with a part of the multilayered steel pipe pile which is protruding upward from the ground surface.

DETAILED DESCRIPTION OF THE INVENTION

Figure 1:
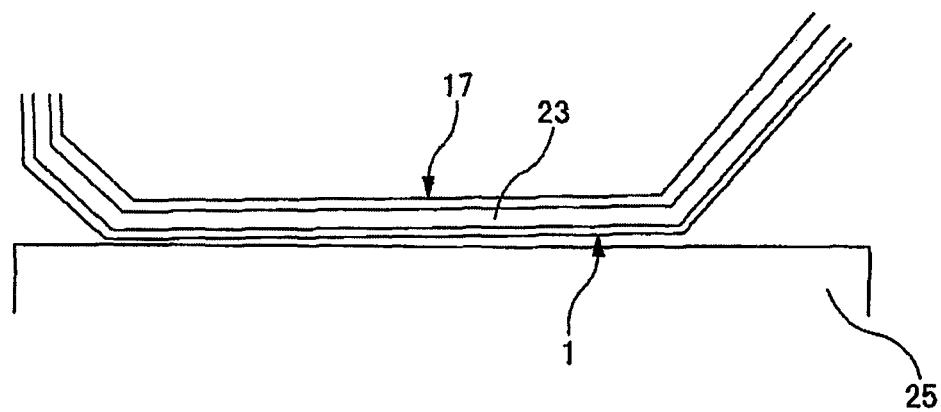
FIG. 1 is a schematic planar view of an embodiment of a tsunami breakwater wall of a multilayered steel pipe pile structure according to the present invention.
Figure 2:
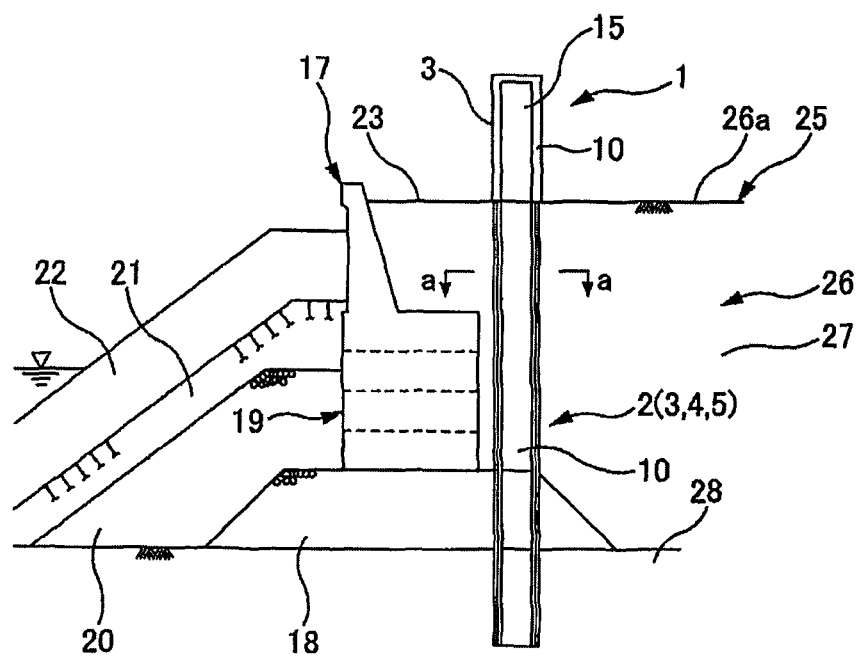
FIG. 2 is a sectional diagram taken along line A-A of FIG. 1.
Figure 3:
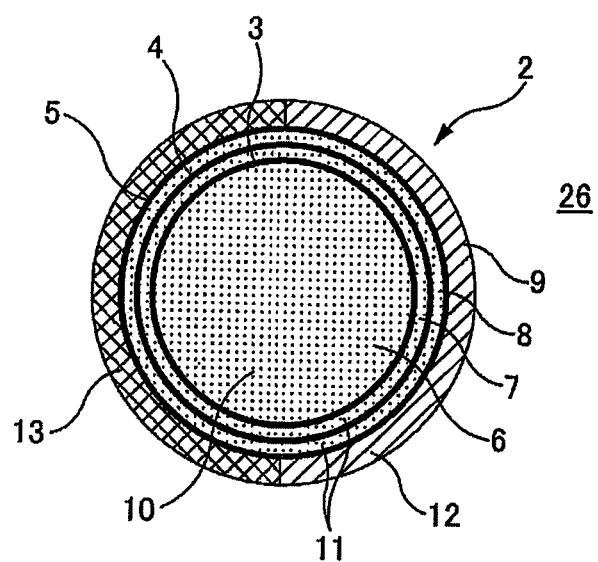
FIG. 3 is a sectional diagram taken along line a-a of FIG. 2.

Description of an embodiment of the present invention will be given with reference to the drawings. FIGS. 1-3 show an embodiment of a tsunami breakwater wall of a multilayered steel pipe pile structure according to the present invention. As shown in FIG. 1, the tsunami breakwater wall of a multilayered steel pipe pile structure 1 (hereinafter called tsunami breakwater wall 1) of the present embodiment is effective in providing measures against tsunamis at areas such as seashores and seaports. In the present embodiment, the tsunami breakwater wall 1 is applied to an area at the seashore where a power plant facility 25 is built along the shoreline.

In the area of the seashore where the power plant facility 25 is built, a seawall 17 is provided along the shoreline to protect the power plant facility 25 from high tides and tsunamis, the road 23 is constructed along the seawall 17 on the land side of the seawall 17 and the power plant facility 25 is located on the land side of the road 23.

As shown in FIG. 2, the seawall 17 includes a lower riprap layer 18 constructed by spreading riprap of a predetermined thickness over the support layer 28, a block layer 19 constructed by stacking a plurality of layers of concrete blocks over the lower riprap layer 18, an upper riprap layer 20 constructed by spreading riprap of a predetermined thickness on the sea side plane of the block layer 19, a cover rock layer 21 formed by spreading cover rock of a predetermined thickness over the upper riprap layer 20, and a wave-dissipating block layer 22 constructed by placing wave-dissipating blocks over the cover rock layer 21. The seawall 17 of such construction is not prepared with sufficient quake-resistance and tsunami-resistance against extremely huge earthquakes such as the Pacific coast of Tohoku earthquake, and therefore countermeasures for tsunamis based on the latest findings earned from the enormous earthquake are required immediately.

The tsunami breakwater wall 1 according to the present embodiment is built using a small space between the power plant facility 25 area and the seawall 17. This tsunami breakwater wall 1 is composed of multilayered steel pipe piles 2 placed with a predetermined interval therebetween and a reinforced concrete wall body 15 set to cover the upper end portion of the multilayered steel pipe piles 2.

As shown in FIGS. 2 and 3, the multilayered steel pipe pile 2 is structured by installing in layers large diameter multilayered steel pipe piles 3 to 5 having different diameters with the bottom ends thereof embedded into the support layer 28 to a predetermined depth and the top end thereof protruding upward from the ground surface 26a by a predetermined length.

In the present embodiment, three steel pipe piles 3 to 5 being the first steel pipe pile 3 with a diameter $\phi=1600$ mm and a thickness $t=25$ mm, the second steel pipe pile 4 with a diameter $\phi=1800$ mm and a thickness $t=25$ mm and the third steel pipe pile 5 with a diameter $\phi=2000$ mm and a thickness $t=25$ mm are used for the multilayered steel pipe pile 2 with these steel pipe piles 3 to 5 being installed concentrically.

The lengths of the first steel pipe pile 3, the second steel pipe pile 4 and the third steel pipe pile 5 are set so that they penetrate through the backfilled earth 27 of the ground 26 and the lower riprap layer 18 of the seawall 17 with the bottom ends thereof being embedded into the support layer 28 to a predetermined depth, and the top end of the first steel pipe pile 3 protruding upward from the ground surface 26a by a predetermined length (approximately 6.5 meters in the present embodiment) and the top ends of the second steel pipe pile 4 as well as the third steel pipe pile 5 reaching a height slightly lower than the ground surface 26a.

A first space 6 of a columnar shape is formed inside the first steel pipe pile 3, filling material 10 is filled inside a part of the first space 6 lower than the ground surface 26a, and the part of the first space 6 above the ground surface 26 is left in a hollow form.

A second space 7 of a tubular shape is formed between the first steel pipe pile 3 and the second steel pipe pile 4, a third space 8 of a tubular shape is formed between the second steel pipe pile 4 and the third steel pipe pile 5. And each of the second space 7 and the third space 8 each have filling material 11 filled therein.

A fourth space 9 of a tubular shape is formed outside the third steel pipe pile 5 with filling material 12 filled inside a part of the fourth space 9 that is in the support layer 28 and filling material 13 is filled inside a part of the fourth space 9 above the support layer 28. Note that, concrete, mortar, cement fluid, chemicals and the like can be given as examples of the filling materials 10, 11, 12 and 13.

The wall body 15 is integrally structured with the protruding portion of the first steel pipe pile 3 by arranging steel bars 35 so to surround a portion of the first steel pipe pile 3 protruding upward from the ground surface 26a, and placing filling material 10 so to embed the steel bars 35. In the present embodiment, a reinforced concrete wall body 15 with a thickness of 2400 mm and a height of 6500 mm is constructed by placing filling material 10 so that both of the covering depths on the sea side and the land side of the first steel pipe pile 3 is approximately 400 mm.

Next, description of the construction procedures of the tsunami breakwater wall 1 according to the present embodiment structured in the aforementioned manner will be given. First, as shown in FIG. 4(a), a hole 32 of a predetermined depth in the supporting layer 28 is formed using a crawler crane 30 to press in the casing tube 31 into the ground 26 while drilling the part inside the casing tube 31.

Figure 4:
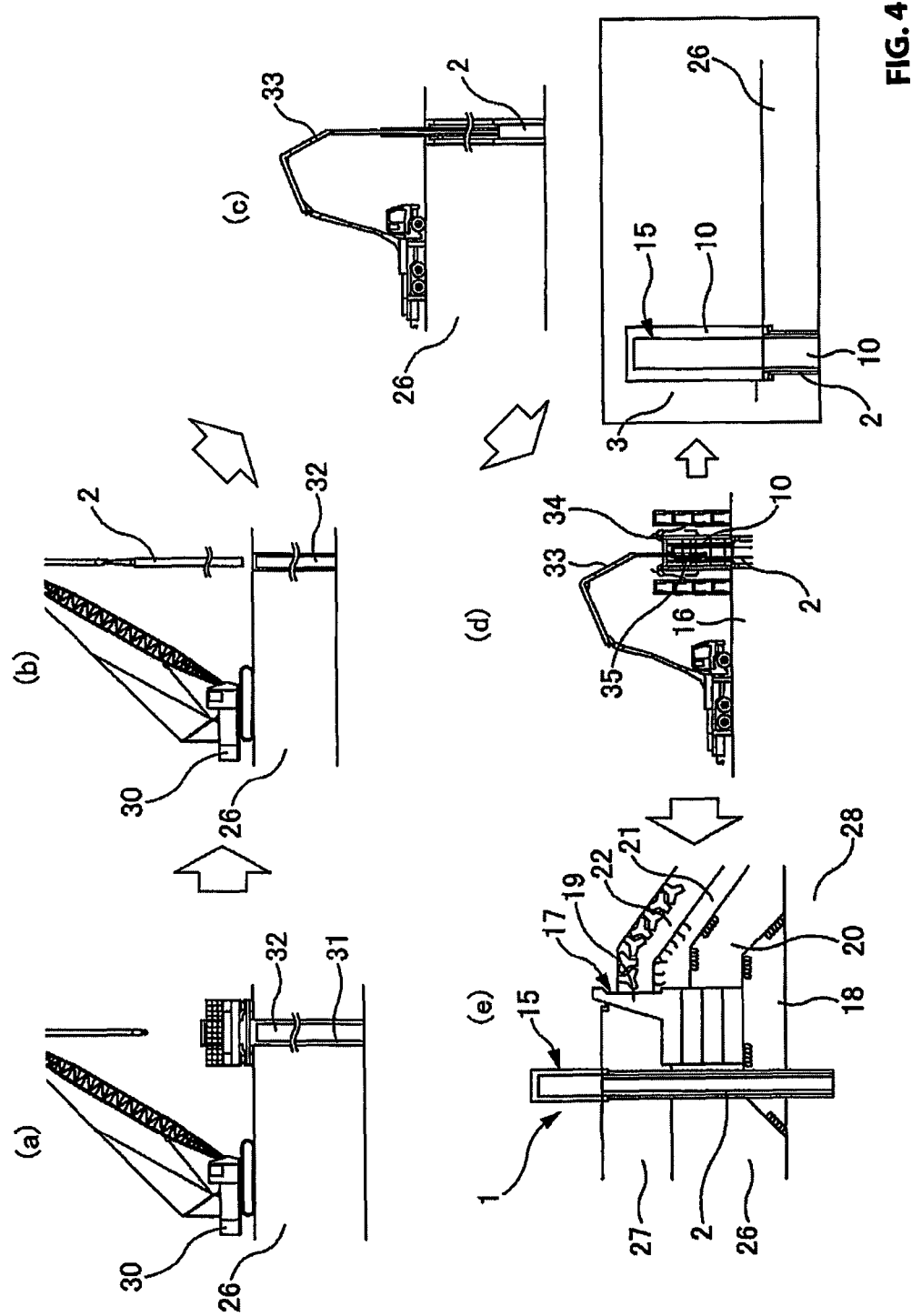
FIG. 4 is an explanatory diagram showing the construction procedures of the tsunami breakwater wall.

Next, as shown in FIG. 4(b), with the use of the crawler crane 30, multilayered steel pipe pile 2 composed of the first steel pipe pile 3, the second steel pipe pile 4 and the third steel pipe pile 5 is erected into the hole 32 formed in the ground 26, the lower end thereof is made to reach the bottom of the hole 32, the upper end of the first steel pipe pile 3 made to protrude upward from the ground surface 26a by a predetermined length and positioning the upper ends of the second steel pipe pile 4 and the third steel pipe pile 5 to a predetermined location below the ground surface 26a.

The first space 6 is formed on the inner side of the first steel pipe pile 3, a second space 7 is formed between the first steel pipe pile 3 and the second steel pipe pile 4, and a third space 8 is formed between the second steel pipe pile 4 and the third steel pipe pile 5, and a fourth space 9 is formed on the outer side of the third steel pipe pile 5 by erecting the first steel pipe pile 3, the second steel pipe pile 4 and the third steel pipe pile 5 into the hole 32 of the ground 26.

Thereafter, as shown in FIG. 4(c), a tremie pipe 33 is inserted into the first space 6 to fill in the first space 6 with filling material 10 through the tremie pipe 33. Further, the tremie pipe 33 is inserted into the second space 7 and the third space 8 to fill in the second space 7 and the third space 8 with filling material 11 through the tremie pipe 33. Furthermore, the tremie pipe 33 is inserted into the fourth space 9 to fill in the part inside the support layer 28 in the fourth space 9 with filling material 12 and the part above the support layer 28 in the fourth space 9 with filling material 13 through the tremie pipe 33.

Subsequently, as shown in FIG. 4(d), formwork 34 is prepared so to surround a part of the first steel pipe pile 3 protruding upward from the ground surface 26a, steel bars 35 are arranged inside the formwork 34 and then filling material 10 is casted inside the formwork 34.

Then as shown in FIG. 4(e), the formwork 34 is removed after curing for a predetermined time. In this way, a reinforced concrete wall body 15 with a predetermined width, height and predetermined covering depth can be constructed to cover the part of the first steel pipe pile 3 protruding upward from the ground surface 26a. And a tsunami breakwater wall 1 integrating a plurality of multilayered steel pipe piles 2 and the wall body 15 can be built.

The tsunami breakwater wall 1 of the present embodiment structured in the aforementioned manner has a simple structure made by installing a plurality of multilayered steel pipe piles 2 to the ground 26 to build a wall body 15 with a predetermined width and height to parts of the multilayered steel pipe piles 2 protruding upward from the ground surface 26a. Therefore, time, effort and expenses for construction can be saved.

And since construction of the wall body 15 is performed by installing a plurality of multilayered steel pipe piles 2 to the ground 26, arranging steel bars 35 to the part of the multilayered steel pipe piles 2 protruding from the ground surface 26a and casting filling material 10, the wall body 15 can be sufficiently constructed at a small and limited space between the power plant facility 25 and the seawall 17 thus the tsunami breakwater wall 1 can be built without interfering with the operation of the power plant facility 25, navigation of ships, use of the road 23 and the like.

The plurality of multilayered steel pipe piles 2 composed of the first steel pipe piles 3, the second steel pipe piles 4 and the third steel pipe piles 5 with large diameters are installed to the ground 26, and the first steel pipe pile 3 and the second steel pipe pile 4, the second steel pipe pile 4 and the third steel pipe pile 5, first steel pipe pile 3 and the ground 26, and the third steel pipe pile 5 and the ground 26 are integrated via filling materials 10, 11, 12 and 13. Therefore, the horizontal force due to tsunamis and the like hitting against the wall body 15 can be certainly transferred to the support layer 28 via the steel pipe piles 3 to 5 of the multilayered steel pipe piles 2. The strength of the multilayered steel pipe pile 2 against horizontal force by such as earthquakes and tsunamis can be increased compared with the case where a single steel pipe pile is installed to the ground 26 so that quake-resistance and tsunami-resistance of the tsunami breakwater wall 1 can be increased by a large amount thus can sufficiently withstand huge earthquakes and tsunamis.

Further, the force of the tsunami that has hit the wall body 15 is transferred to the steel pipe piles 3 to 5 of the multilayered steel pipe pile 2 via the first steel pipe pile 3 on the innermost side, and then transferred to the support layer 28 of the ground 26 via the steel pipe piles 3 to 5. And in this case, the reinforced concrete wall body 15 is constructed integral with the part of the first steel pipe pile 3 protruding upward from the ground surface 26a while this part of the first steel pipe pile 3 protruding from the ground surface 26a is left hollow so that the weight of the wall body 15 can be reduced by an amount the first steel pipe pile 3 is left hollow. Therefore, the bending moment to be transferred to the first steel pipe pile 3 when the wall body 15 experiences a seismic force can be alleviated thus allowing the multilayered steel pipe pile 2 to be kept in shape.

As mentioned above, the tsunami breakwater wall 1 of the present embodiment can satisfy the quake resistance and tsunami resistance based on the latest knowledge thus being able to sufficiently withstand seismic force and tsunami force due to huge earthquakes such as that of the off the Pacific coast of Tohoku earthquake and the like. Therefore, the power plant facility 25 can be prevented from being damaged by a tsunami.

Note that, in the above description, the multilayered steel pipe pile 2 has been structured with the first steel pipe pile 3, the second steel pipe pile 4 and the third steel pipe pile 5, however, the multilayered steel pipe pile may be structured with two or four or more steel pipe piles. Also, the wall body 15 was assumed to be of a reinforced concrete structure, however, the structure is not limited to such and may be of steel framed concrete or steel framed reinforced concrete.

Further in the above description, the tsunami breakwater wall 1 of the present invention has been placed at a seashore area where the power plant facility 25 is located, however, the tsunami breakwater wall 1 of the present invention may be located at areas of other seashores, seaports and the like.

REFERENCE SIGNS LIST

1 tsunami breakwater wall of a multilayered steel pipe pile structure
2 multilayered steel pipe pile
3 first steel pipe pile
4 second steel pipe pile
5 third steel pipe pile
6 first space
7 second space
8 third space
9 fourth space
10 filling material
11 filling material
12 filling material
13 filling material
15 wall body
17 seawall
18 lower riprap layer
19 block layer
20 upper riprap layer
21 cover rock layer
22 wave-dissipating block layer
23 road
25 power plant facility
26 ground
26a ground surface
27 backfilled earth
28 support layer
30 crawler crane
31 casing tube
32 hole
33 tremie pipe
34 formwork
35 steel bars

What is claimed is:
1. A tsunami breakwater wall of a multilayered steel pipe pile structure, comprising:
   a multilayered steel pipe pile where a bottom end thereof reaches a predetermined depth of a support layer and is installed to a ground such that an upper end thereof protrudes upward from a ground surface; and
   a wall body constructed integral with a part of the multilayered steel pipe pile so that the wall body covers the part, the part protruding upward from the ground surface.
2. The tsunami breakwater wall of a multilayered steel pipe pile structure according to claim 1, wherein
   the multilayered steel pipe pile is made from a plurality of large diameter steel pipe piles of different diameters.
3. The tsunami breakwater wall of a multilayered steel pipe pile structure according to claim 2, wherein
   an upper end of an inner most side steel pipe pile of the multilayered steel pipe pile protrudes upward from the ground surface, and
   the wall body is constructed to a part of the steel pipe pile protruding upward from the ground surface.
4. The tsunami breakwater wall of a multilayered steel pipe pile structure according to claim 3, wherein
   space is provided respectively, on an inner surface side of an innermost steel pipe pile of the multilayered steel pipe pile, between adjacent steel pipe piles, and on an outer side of a steel pipe pile of the outermost side, and
   filling material is filled into the spaces.
5. The tsunami breakwater wall of a multilayered steel pipe pile structure according to claim 4, wherein
   a part of an inner face side of the innermost side steel pipe pile which protrudes upward from the ground surface is formed hollow.
6. The tsunami breakwater wall of a multilayered steel pipe pile structure according to claim 2, wherein
   space is provided respectively, on an inner surface side of an innermost steel pipe pile of the multilayered steel pipe pile, between adjacent steel pipe piles, and on an outer side of a steel pipe pile of the outermost side, and
   filling material is filled into the spaces.
7. The tsunami breakwater wall of a multilayered steel pipe pile structure according to claim 6, wherein
   a part of an inner face side of the innermost side steel pipe pile which protrudes upward from the ground surface is formed hollow.
8. A tsunami breakwater construction method, comprising:
   a process of placing a multilayered steel pipe pile to a ground so that a bottom end thereof reaches a predetermined depth of a support layer and an upper end thereof protrudes upward from a ground surface; and
   a process of constructing a wall body integral with a part of the multilayered steel pipe pile so that the wall body covers the part, the part protruding upward from the ground surface.

\* \* \* \* \*